No. 633,333. Patented Sept. 19, 1899.
W. L. BEALL.
ADJUSTABLE CLAMP FOR CULTIVATOR TEETH.
(Application filed July 20, 1899.)
(No Model.) 2 Sheets—Sheet 2.
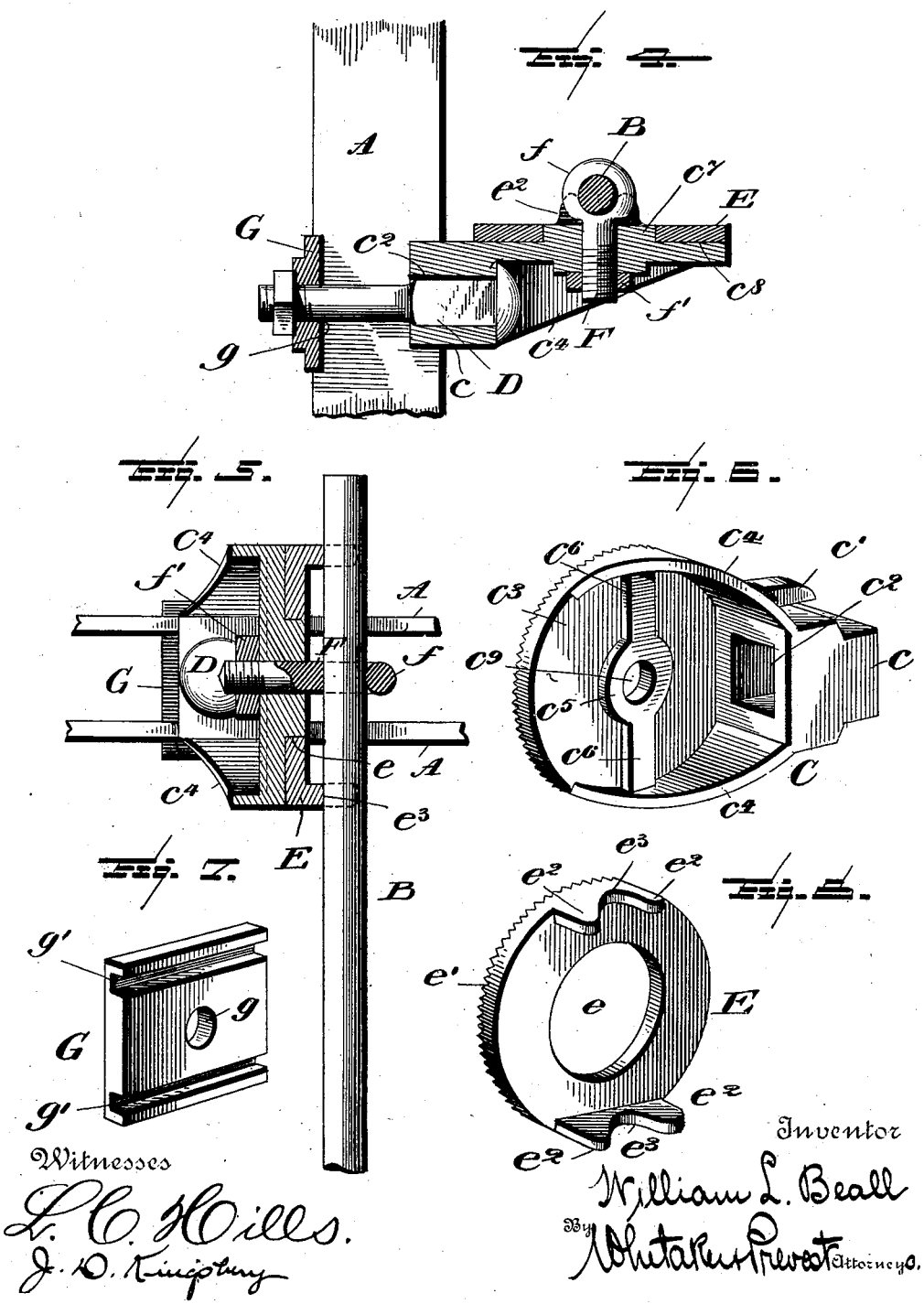

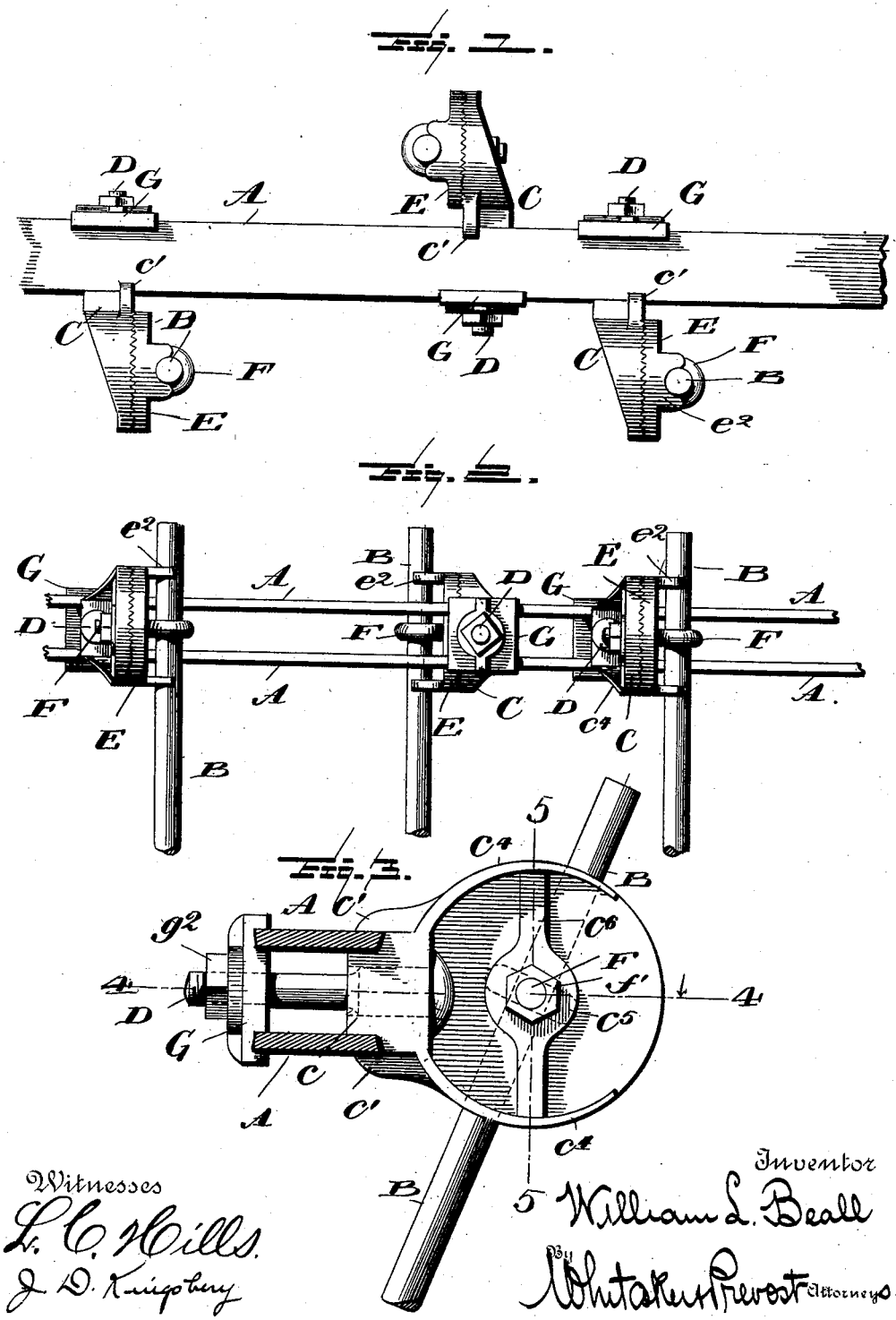

UNITED STATES PATENT OFFICE.

WILLIAM L. BEALL, OF ALBION, MICHIGAN, ASSIGNOR TO THE GALE MANUFACTURING COMPANY, OF SAME PLACE.

ADJUSTABLE CLAMP FOR CULTIVATOR-TEETH.

SPECIFICATION forming part of Letters Patent No. 633,333, dated September 19, 1899.

Application filed July 20, 1899. Serial No. 724,552. (No model.)

*To all whom it may concern:*

Be it known that I, WILLIAM L. BEALL, a citizen of the United States, residing at Albion, in the county of Calhoun and State of Michigan, have invented certain new and useful Improvements in Adjustable Clamps for Cultivator-Teeth; and I do hereby declare the following to be a full, clear, and exact description of the invention, such as will enable others skilled in the art to which it appertains to make and use the same.

My invention is an improvement in adjustable clamps for cultivator-teeth; and it consists in the novel features hereinafter described, reference being had to the accompanying drawings, which illustrate one form in which I have contemplated embodying my invention; and said invention is fully disclosed in the following description and claims.

Referring to the drawings, Figure 1 represents a top plan view of a beam forming part of a cultivator and provided with three of my improved clamps. Fig. 2 is a rear elevation of the same. Fig. 3 is an enlarged side elevation of one of the clamps, showing the beam in section. Fig. 4 represents a horizontal section on line 4 4 of Fig. 3. Fig. 5 represents a vertical transverse section on line 5 5 of Fig. 3. Figs. 6, 7, and 8 are detail views of parts of the device detached.

My invention relates to that class of cultivators in which the cultivator-beam, to which the cultivator teeth or shovels are attached, is formed of two parallel bars, one above the other, the said beam being ordinarily disposed transversely to the line of draft, although my invention may be employed with a beam of this character arranged in other ways with respect to the cultivator-frame.

A A represent the two parallel bars forming the cultivator-beam, to which the shanks B of the cultivator-teeth or shovels are attached by means of my improved adjustable clamp.

C represents the main portion of my clamp, which is provided on the side adjacent to the parallel bars with a spacing portion $c$, adapted to fit between the parallel bars, as shown in Figs. 3 and 4, and hold them at the proper distance apart. The part C is also provided above and below the spacing portion $c$ with lugs or projections $c'$ for engaging the outer faces of the parallel bars to prevent them from spreading. The part C is also provided with an aperture $c^2$, extending through the spacing portion $c$, said aperture being preferably square in cross-section to receive the squared portion of the clamping-bolt D, as shown, and prevent said bolt from turning. The part C is also provided with a substantially circular portion or disk $c^3$, which is strengthened by reinforcing-flanges $c^4$, extending from said disk to the portion of the part C surrounding the bolt-hole $c^2$. This disk $c^3$ is provided on the side adjacent to the bolt-hole with an annular reinforcing-boss $c^5$ and reinforcing-webs $c^6$ $c^6$, extending from said boss to the reinforcing-flanges $c^4$, and on the side opposite said bolt-hole the disk is provided with a central circular hub or boss $c^7$ and an annular radially-serrated portion $c^8$, surrounding said hub.

E represents an adjustable tooth-holding plate (shown in detail in Fig. 8) which is preferably circular and is provided with a central aperture $e$, adapted to engage the hub or boss $c^7$ on the part C. The plate E is provided on its inner face with an annular radially-serrated portion $e'$, the serrations of which interlock with the serrations $c^8$ of the part C, and on its outer face the plate E is provided at opposite sides of its center with laterally-projecting lugs $e^2$ $e^2$, each provided with a recess $e^3$ to receive the shank B of a cultivator tooth or shovel.

F represents a clamping-eyebolt having at one end an eye $f$, which surrounds the shank B, and at the other end a threaded portion, which is passed through a central aperture $c^9$ in the disk $c^3$, which extends through the hub $c^7$ and boss $c^5$, and said bolt is provided with a nut $f'$ for clamping the shank B firmly in the recesses $e^3$ $e^3$ of the adjustable plate E and holding said adjustable plate rigidly in engagement with the disk $c^3$ of the part C.

G represents a clamping-plate provided with a central bolt-hole $g$ and with parallel longitudinal grooves $g'$ $g'$, which embrace the edges of the parallel bars A A. (See Fig. 3.)

To secure the clamp to the parallel bars, the main body C is placed in engagement with the parallel bars, with the spacing portion $c$ between said bars, and the clamping-plate G is placed in engagement with said bars on the opposite side thereof from the part C. The clamping-bolt D is then passed through the squared aperture $c^2$ in the main body of the clamp, and its threaded portion is passed through the aperture $g$ in the clamping-plate G and provided with a nut $g^2$, which is screwed up to clamp the part C firmly to the parallel bars. It will be obvious that by loosening the nut $g^2$ the clamp C can be moved longitudinally of the parallel bars A A to any desired position, and it will also be obvious that the main body C of the clamp can be placed on either side of said parallel bars, if desired, and in Fig. 1 I have shown two of said clamps on one side of the cultivator-beam and one intermediate the same on the other side of the beam to illustrate how this may be done. It will also be seen that the shank B is adjustable in a vertical plane perpendicular to the cultivator-beam upon the eyebolt F as a pivot. To effect this adjustment, the nut $f'$ is loosened to permit the adjustable plate E to be moved away from the disk $c^3$ far enough to disengage the interlocking radial serrations of the plate and disk, when the shank and plate E may be turned to the desired position, and the shank B can also be moved up or down with respect to the eyebolt and retaining-lugs $e$ to regulate the depth to which the tooth shall enter the soil. By tightening the nut $f'$ the parts can be securely clamped in their adjusted positions. It will be noted that while the adjustable plate E turns upon the hub or boss $c^7$ of the disk $c^3$ the axis of movement will be the axis of the eyebolt F, as the hub is concentric therewith.

What I claim, and desire to secure by Letters Patent, is—

1. The combination with a cultivator-beam consisting of two parallel bars, of an adjustable tooth-clamp, means for securing said clamp to said bars and independent tooth-holding devices adjustable in a plane perpendicular to said parallel bars, substantially as described.

2. The combination with a cultivator-beam comprising two parallel bars, of a tooth-clamp provided with a spacing portion adapted to lie between said bars, means for clamping said device to said bars and independent tooth-holding devices secured to said clamp and adjustable in a plane perpendicular to said parallel bars, substantially as described.

3. The combination with a cultivator-beam comprising two parallel bars, of a tooth-clamp having a spacing portion adapted to lie between said bars and a disk or plate disposed at an angle to said bar, clamping devices for securing said tooth-clamp to said bars, an adjustable tooth-plate pivoted to said disk or plate and adjustable thereon, and tooth-holding devices for securing a tooth to said adjustable plate, substantially as described.

4. An adjustable tooth-clamp comprising among its members a main portion provided with a spacing portion adapted to pass between parallel portions of a cultivator-beam and provided also with a plate or disk, clamping devices for securing said main portion to the cultivator-beam, an adjustable tooth-plate engaging said disk or plate and having devices for receiving the shank of a tooth and a bolt passing through said plate or disk and provided with means for engaging the tooth-shank, substantially as described.

5. An adjustable tooth-clamp comprising among its members the main body provided with a spacing portion adapted to pass between the parallel portions of a cultivator-beam, retaining projections on opposite sides of said spacing portion and a plate or disk provided with a circular hub, clamp devices for securing said main body to the cultivator-beam, a tooth-holding plate having a circular aperture to engage said hub and recessed projections for engaging the tooth-shank and a tooth-holding bolt extending through said hub and having a portion engaging the tooth-shank, substantially as described.

6. An adjustable tooth-clamp comprising among its members a main body provided with a spacing portion adapted to extend between parallel portions of the cultivator-beam and provided with an aperture therethrough, said main body having retaining projections on opposite sides of said spacing portion and a plate or disk provided with a circular hub, a clamping-bolt adapted to extend through the aperture in the said main body, a clamping-plate provided with an aperture for said bolt, an adjustable tooth-holding plate provided with a central aperture for engaging said hub and with recessed projections for engaging the shank of a cultivator-tooth and a tooth-holding bolt extending through said hub and provided with a portion engaging the shank of a tooth, substantially as described.

7. An adjustable tooth-holding clamp comprising among its members, a main body provided with an annular plate or disk having a circular hub and an aperture concentric therewith, said disk having an annular radially-serrated portion surrounding said hub, of a tooth-holding plate provided with a central aperture for engaging said hub and having annular radially-serrated portions surrounding said aperture on one side of the plate and recessed tooth-engaging projections on the other side of the plate on opposite sides of said central aperture, a bolt extending through the aperture in said disk and provided with an eye for engaging the shank of a tooth and clamping devices for securing said main body to a cultivator-beam, substantially as described.

8. The combination with a cultivator-beam comprising two parallel bars, of an adjustable tooth-clamp comprising among its members a main body having a spacing portion adapted to lie between said bars and retaining projections on opposite sides of said spacing portion for engaging the outer faces of said parallel bars, said main body being provided with a bolt-aperture extending through said spacing portion and with a plate or disk disposed perpendicular to the said parallel bars and provided with a central hub and an annular serrated portion surrounding said hub, of a clamping-bolt extending through said bolt-aperture, a clamping-plate engaging said parallel bars on the side opposite said main body and provided with an aperture for said bolt, an adjustable tooth-holding plate having a central aperture for engaging said hub, an annular serrated portion surrounding said aperture and having recessed tooth-engaging projections on opposite sides of the center of said aperture and a bolt passing through said hub and having a portion for engaging the shank of a tooth between the tooth-engaging projections of said adjustable plate, substantially as described.

In testimony whereof I affix my signature in the presence of two witnesses.

WILLIAM L. BEALL.

Witnesses:
G. W. BORTLES,
FRED. T. LAWLER.